(12) United States Patent
Benes

(10) Patent No.: US 8,461,818 B1
(45) Date of Patent: Jun. 11, 2013

(54) TRANSIENT RESPONSE DEVICE, HAVING PARALLEL CONNECTED DIODE AND TRANSISTOR, FOR IMPROVING TRANSIENT RESPONSE OF POWER SUPPLY

(75) Inventor: Michael J. Benes, Irvington, NJ (US)

(73) Assignee: Agilent Technologies, Inc., Santa Clara, CA (US)

( * ) Notice: Subject to any disclaimer, the term of this patent is extended or adjusted under 35 U.S.C. 154(b) by 514 days.

(21) Appl. No.: 12/689,332

(22) Filed: Jan. 19, 2010

(51) Int. Cl.
*G06F 1/00* (2006.01)

(52) U.S. Cl.
USPC ............................................ 323/282; 323/280

(58) Field of Classification Search
USPC ................ 323/271, 272, 279, 280, 281, 282, 323/284
See application file for complete search history.

(56) References Cited

U.S. PATENT DOCUMENTS

| | | | | |
|---|---|---|---|---|
| 5,726,505 | A * | 3/1998 | Yamada et al. | 307/127 |
| 6,075,351 | A | 6/2000 | Benes | |
| 6,677,735 | B2 * | 1/2004 | Xi | 323/273 |
| 6,800,802 | B2 * | 10/2004 | Chou | 136/244 |
| 6,891,425 | B1 * | 5/2005 | Huynh | 327/427 |
| 7,233,469 | B2 * | 6/2007 | Vinciarelli et al. | 361/78 |
| 7,675,116 | B2 * | 3/2010 | Fukuda | 257/355 |

* cited by examiner

*Primary Examiner* — Adolf Berhane
*Assistant Examiner* — Emily Pham

(57) ABSTRACT

A device for improving transient response of a power supply includes a diode connected in series with an output of the power supply and configured to provide a predetermined voltage drop to an output voltage of the power supply. The device further includes a source follower transistor connected in parallel with the diode and configured to be selectively activated to remove at least a portion of the predetermined voltage drop of the diode from the output voltage of the power supply during a transient period, in which an output current of the device is increasing.

19 Claims, 2 Drawing Sheets

TRANSIENT RESPONSE DEVICE, HAVING PARALLEL CONNECTED DIODE AND TRANSISTOR, FOR IMPROVING TRANSIENT RESPONSE OF POWER SUPPLY

BACKGROUND

Power supplies generally include regulated linear power supplies and switching power supplies. In a linear power supply, a control element, such as a series regulator transistor or variable resistor, is connected in series between a rectified supply voltage and a load. A feedback circuit monitors the output of the linear power supply and adjusts the series control element in response to maintain a constant output voltage. Although transient response of a typical linear power supply is very quick, a linear power supply usually has low efficiency, since the series control element operating in the linear mode continuously dissipates power, and tends to generate a large amount of heat.

In comparison, a switching power supply typically operates at relatively high efficiency and low temperature rise. In a switching power supply, a pulse width modulated (PWM) element (or other circuit capable of rapid switching) is connected in series between a DC supply voltage and the load. A feedback circuit monitors the output of the switching power supply and controls the PWM circuit to vary the on/off periods (i.e., duty cycle) to control the output voltage during changes in output current. For example, in order to increase the output voltage, the PWM circuit may increase the width of the on pulse with respect to the width of the off pulse, resulting in an overall higher output voltage. Accordingly, switching power supplies dissipate much less power, and are smaller and lighter than comparable linear power supplies. However, a switching power supply typically has a slow transient response when responding to increased current demand, since it usually includes a relatively large output capacitor required to keep output ripple low.

Attempts to improve transient response in switching power supplies have generally included increasing the gain of the error amplifier, which detects changes in output voltage. For example, the value of a compensation capacitor of the error amplifier may be reduced in order to reduce the transient amplitude. In practice, however, this technique may result in an unstable or oscillatory control loop. Also, a conventional power supply described, for example, in U.S. Pat. No. 6,075,351, issued Jun. 1, 2000, which is hereby incorporated by reference, requires the power supply output stage itself to be capable of quick response when driven by its error amplifier. This solution is of limited value when attempting to speed up a switching power supply, for instance, which has inherently slow response due to the relatively large energy storage elements (e.g., inductors and capacitors).

SUMMARY

In a representative embodiment, a device for improving transient response of a power supply includes a diode connected in series with an output of the power supply and configured to provide a predetermined voltage drop to an output voltage of the power supply. The device further includes a source follower transistor connected in parallel with the diode and configured to be selectively activated to remove at least a portion of the predetermined voltage drop of the diode from the output voltage of the power supply during a transient period, in which an output current of the device is increasing.

In another representative embodiment, a transient response device for improving transient response of a power supply includes a diode, a gain stage amplifier, a differential amplifier/driver and a transistor. The diode includes an anode connected in series with a power supply output and a cathode connected to an output of the transient response device, and is configured to provide a predetermined voltage drop to an output voltage of the power supply. The gain stage amplifier is configured to output a gain stage voltage based on an error voltage of an error amplifier in the power supply. The differential amplifier/driver is configured to output a drive voltage based on the gain stage voltage of the gain stage amplifier and an anode voltage at the anode of the diode. The transistor includes a gate connected to an output of the differential amplifier/driver to receive the drive voltage, a drain connected to the anode of the diode, and a source connected to the cathode of the diode. The transistor is selectively activated in response to the drive voltage to remove at least a portion of the predetermined forward voltage drop of the diode from the power supply voltage during a transient period, in which an output current of the device is increasing.

In another representative embodiment, a regulated power supply device includes a switching power supply circuit and a transient response circuit. The switching power supply circuit has a first output to output a power supply voltage, and the transient response circuit is connected to the switching power supply and has a second output to output an adjusted power supply voltage. The switching power supply includes an error amplifier configured to output an error voltage based on a reference voltage and a sense voltage fed back from the second output; and a pulse width modulator (PWM) configured to generate the power supply voltage in response to the error voltage of the error amplifier. The transient response circuit includes a gain stage amplifier, a diode, a differential amplifier/driver and a transistor. The gain stage amplifier is configured to output a gain stage voltage based on a common voltage and the error voltage of the error amplifier selectively received trough an AC coupler. The diode includes an anode connected in series with the first output and a cathode connected to the second output, the diode being configured to cause a predetermined forward voltage drop in the power supply voltage output from the first output of the power supply device. The differential amplifier/driver is configured to output a drive voltage based on the gain stage voltage of the gain stage amplifier and an anode voltage at the anode of the diode. The transistor includes a gate connected to an output of the differential amplifier/driver to receive the drive voltage, a drain connected to the anode of the diode, and a source connected to the cathode of the diode. The transistor is selectively activated in response to the drive voltage to remove at least a portion of the predetermined forward voltage drop of the diode from the power supply voltage to increase the adjusted power supply voltage when the sense voltage begins decreasing.

BRIEF DESCRIPTION OF THE DRAWINGS

The example embodiments are best understood from the following detailed description when read with the accompanying figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

According to various embodiments, a transient response circuit is connected in series with the output stage of a power supply to improve transient response due to an increase in output current. The transient response circuit includes a diode connected in series with the output stage of the power supply, and a transistor in a source follower stage (or emitter follower stage) controlled to partially or entirely bypass the diode when the power supply is required to quickly increase its output voltage, thus removing all or part of a forward voltage drop of the diode from the output voltage. Accordingly, a relatively slow power supply, such as a switching power supply, is able to provide a fast transient response, similar to that which can be achieved using a linear power supply.

Generally, the source follower stage connected in series with the output stage of the slow power supply improves the output response to current transients that are above a certain minimal level by momentarily increasing the effective bandwidth of the power supply. For DC operation and for current transients below the minimal level, the operation and/or output impedance of the power supply are basically unaffected.

Figure 1:
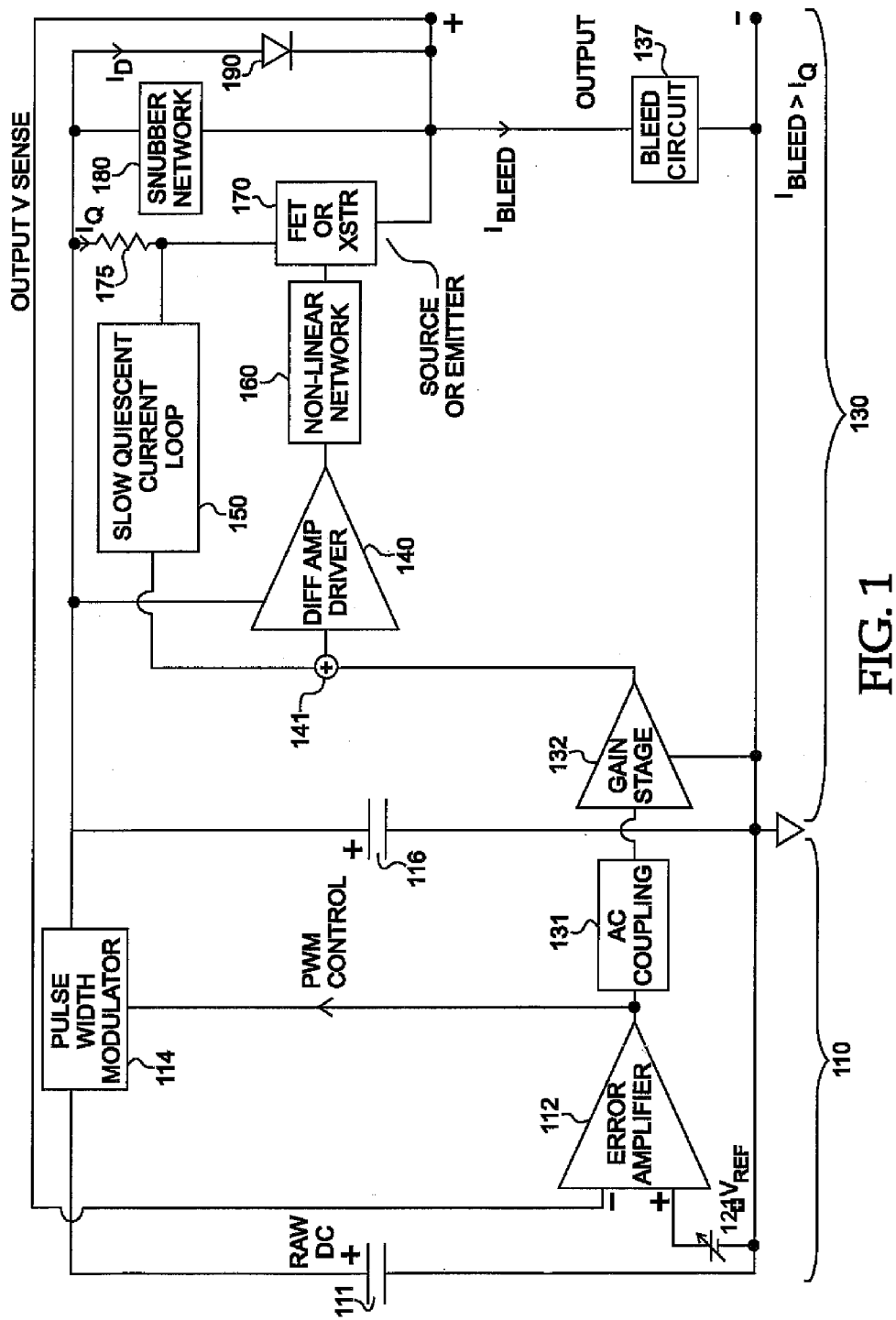
FIG. 1 is a block diagram illustrating a regulated power supply and transient response circuit, according to a representative embodiment.

FIG. 1 is a block diagram illustrating a regulated power supply and transient response circuit, according to a representative embodiment.

Referring to FIG. 1, transient response circuit 130 is connected in series with an output stage of the power supply 110. For purposes of explanation, the power supply 110 is depicted as a switching power supply, since switching power supplies typically have slower transient responses than linear power supplies. However, it is understood that the transient response circuit 130 may be connected to the output stage of a linear power supply or other type of power supply, without departing from the scope of the present teachings, and function in substantially the same manner as discussed herein with respect to the switching power supply 110.

The power supply 110 includes voltage source 111, pulse width modulator (PWM) circuit 114 and error amplifier 112. The voltage source 111 is a raw DC voltage source, for example. The output of the power supply 110 is provided across PWM output capacitor 116, connected between an output of the PWM circuit 114 and a common voltage (e.g., ground voltage). The error amplifier 112 is a differential amplifier, for example, having a first input connected to adjustable reference voltage $V_{REF}$ 121, a second input connected to a positive output terminal of the transient response circuit 130 for sensing the output voltage, and an output connected to the PWM circuit 114 to provide an error signal as the PWM control signal.

As configured, the error amplifier 112 receives sense voltage $V_{SENSE}$ through a feedback circuit for sensing the output voltage of the transient response circuit 130 at the second input, and compares the sense voltage $V_{SENSE}$ with the adjustable reference voltage $V_{REF}$ 121 received at the first input. The error amplifier 112 outputs an error signal (i.e., the PWM control signal) indicating the difference between the sense voltage $V_{SENSE}$ and the reference voltage $V_{REF}$ 121. The PCM control signal is provided to the PWM circuit 114, which adjusts its duty cycle in response to compensate for changes in the output voltage of the transient response circuit 130 and/or the reference voltage $V_{REF}$ 121. For example, when the sense voltage $V_{SENSE}$ indicates a drop in the output voltage, the error amplifier 112 outputs a positive error signal, which controls the PCM circuit 114 to increase the voltage level. Thus, the power supply 110 functions similarly to when there is no transient response circuit 130, except that the feedback signal (sense voltage $V_{SENSE}$) is received from the output of the transient response circuit 130, as opposed to the output of the power supply 110.

The error signal output of the error amplifier 112 is also provided to the transient response circuit 130. More particularly, the error signal is AC coupled by AC coupler 131 to gain stage amplifier 132, which amplifies the level of the error signal. An adder 141 receives and adds the amplified error signal and an output of slow quiescent current loop 150. The result of the adding operation is provided to differential amplifier/driver 140, which outputs a drive signal for controlling transistor 170 through non-linear network 160. The transistor 170 is connected in parallel with snubber network 180 and diode 190, each of which is connected between the output of the PWM circuit 114 and the positive output terminal of the transient response circuit.

In various embodiments, the transistor 170 may be a may be a field effect transistor (FET), such as a metal-oxide-semiconductor field-effect transistor (MOSFET), for example, in which case the transistor 170 is configured as a source follower (common-drain) transistor, where the source voltage follows the gate voltage. When transistor 170 is a FET, it includes a gate that is controlled by the drive signal from the differential amplifier/driver 140, a drain connected to the output of the PWM circuit 114 via shunt circuit 175, and a source connected to the positive output terminal of the transient response circuit 130.

The transistor 170 may be implemented using various types of FETs and/or other types of transistors, without departing from the scope of the present teachings. For example, in various embodiments, the transistor 170 may be a bipolar junction transistor (BJT), for example, in which case the transistor 170 is configured as an emitter follower (common collector) transistor, where the emitter voltage follows the base voltage. When transistor 170 is a BJT, it includes a base controlled by the drive signal from the differential amplifier/driver 140, a collector connected to the output of the power supply 110 (from the PWM circuit 114) via shunt circuit 175, and an emitter connected to the positive output terminal of the transient response circuit 130.

The diode 190 may be a p-n junction silicon diode and/or multiple diodes connected in series, for example, although various types and numbers of diodes may be incorporated, without departing from the scope of the present teachings. The diode 190 includes an anode connected to the output of the power supply 110 and a cathode connected to the positive output terminal of the transient response circuit 130. In this configuration, the diode 190 conducts current $I_D$ when the transistor 170 is conducting the quiescent current $I_Q$, causing a forward voltage drop, e.g., of about 0.7V, in the voltage output by the power supply 110 (without the transient response circuit 130).

In the depicted embodiment, the transistor 170 is biased slightly on with quiescent current $I_Q$ which is less than $I_{BLEED}$, as discussed below, when the voltage output by the power supply 110 is unchanged or decreasing. In this state, the diode 190 conducts current $I_D$ and subtracts the forward voltage drop from the voltage output of the power supply 110. The transistor 170 is turned on harder during a transient period, when the current output of the transient response circuit 130 is increasing in order to compensate for the drop on the PWM output capacitor 116 during the loading transient.

During a large load current transient, the transistor 170 may turn on completely, so that the diode 190 is substantially bypassed and thus effectively shorted out. In this state, the diode 190 does not conduct current $I_D$ or insert any forward voltage drop. Accordingly, the voltage output of the transient response circuit 130 can quickly increase up to one diode forward voltage drop, which can cancel up to 0.7V voltage drop, for example, present on the PWM output capacitor 116. When the output current increases gradually or by a small amount, the transistor 170 is partially turned on, so that only a portion of the forward voltage drop of the diode 190 is removed from the voltage output of the power supply 110. The improvement in the transient response therefore varies to fit the particular circumstances.

For example, if the sense voltage $V_{SENSE}$ begins decreasing (and/or the reference voltage $V_{REF}$ 121 increases), the error amplifier 112 detects the difference between the sense voltage $V_{SENSE}$ and the reference voltage $V_{REF}$ 121, and adjusts the error signal (PWM control signal) to increase the voltage output of the PWM circuit 114. However, the PWM output capacitor 116 in the output stage of the power supply 110 is not capable of increasing quickly. Therefore, in various embodiments, the transistor 170 is turned on (in response to the adjusted error signal received by the transient response circuit 130 through the AC coupler 131), which shorts out the diode 190, quickly adding the forward voltage drop (e.g., 0.7V) to the output of the transient response circuit 130, compensating for the decrease in output voltage indicated by the sense voltage $V_{SENSE}$.

The snubber network 180 may be an RC circuit, for example, connected between the output of the power supply 110 and the positive output terminal of the transient response circuit 130. The snubber network 180 is configured to provide for local stability of the source follower stage.

In the depicted embodiment, the transient response circuit 130 also includes a bleed circuit 137, connected between the positive output terminal and the negative output terminal (e.g., common or ground voltage). The bleed circuit 137 provides a small bleed current $I_{BLEED}$ when there is no load across the output terminals of the transient response circuit 130, in which case the sum of a quiescent current $I_Q$ through the shunt circuit 175 and a diode current $I_D$ through the diode 190 is equal to the bleed current $I_{BLEED}$. In various embodiments, the bleed circuit 137 may be included within the power supply 110.

Figure 2:
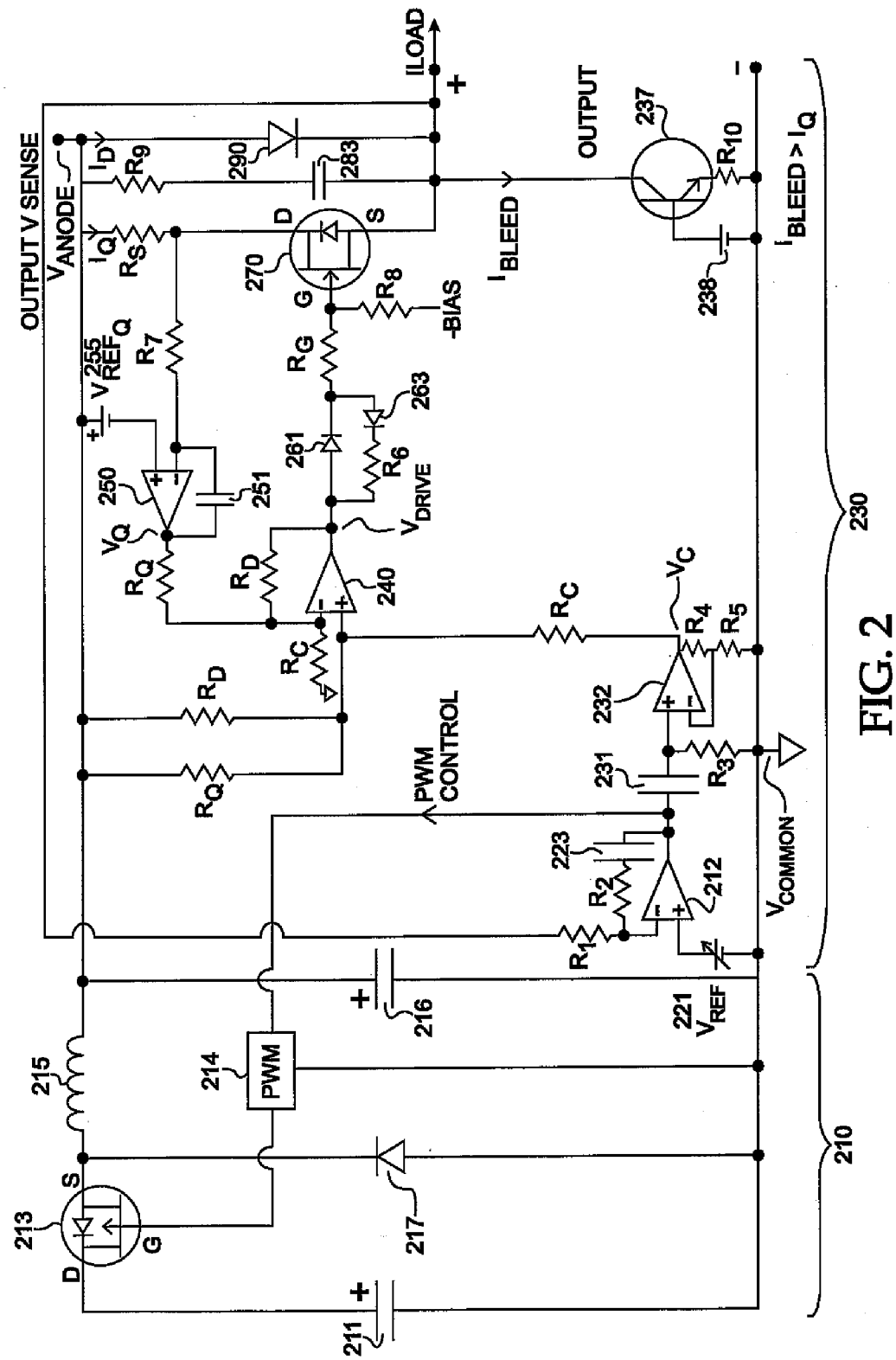
FIG. 2 is a circuit diagram illustrating a regulated power supply and transient response circuit, according to a representative embodiment.

FIG. 2 is a further detailed circuit diagram illustrating a regulated power supply and transient response circuit, according to a representative embodiment.

Referring to FIG. 2, transient response circuit 230 is connected in series with an output stage of the power supply 210. For purposes of explanation, the power supply 210 is depicted as a switching power supply, since switching power supplies typically have slower transient responses than linear power supplies. However, it is understood that the transient response circuit 230 may be connected to the output stage of a linear power supply or other type of power supply, without departing from the scope of the present teachings, and function in substantially the same manner as discussed herein with respect to the switching power supply 210.

The power supply 210 includes voltage source 211, error amplifier 212, and a PWM circuit including PWM 214 and a PWM buck converter. The voltage source 211 is a raw DC voltage source, for example. The PWM buck converter includes FET 213, first stage choke 215 and catch diode 217. The FET 213 has a gate connected to the PWM 214 to receive a gate drive signal, a drain connected to a positive terminal of the voltage source 211 and a source connected to a positive terminal of the output of the power supply 210 through the first stage choke 215. The first stage choke 215 is configured to filter the square wave of voltage present at the source of the FET 213. The catch diode 217 has an anode connected to a common voltage, indicated as $V_{COMMON}$ (e.g., ground voltage) and a cathode connected between the FET 213 and the first stage choke 215. The output of the power supply 210 is provided across PWM output capacitor 216, connected between the first stage choke 215 and the common voltage $V_{COMMON}$.

As discussed above, the error amplifier 212 is a differential amplifier, for example, having a positive input connected to adjustable reference voltage $V_{REF}$ 221, a negative input connected to the positive output terminal of the transient response circuit 230 through resistor $R_1$, and an output connected to the PWM 214 to provide an error signal as the PWM control signal. An RC compensation circuit, including resistor $R_2$ and compensation capacitor 223, is connected in series between the output and the negative input of the error amplifier 212. The negative input of the error amplifier 212 receives sense voltage $V_{SENSE}$, which provides remote sensing of the output of the transient response circuit 230. The sense voltage $V_{SENSE}$ indicates changes in the output voltage, such as voltage drops caused by increased current drawn by a load, e.g., a test cable and device under test (DUT), connected to the output terminals of the transient response circuit 230. For example, the $V_{SENSE}$ point can be remotely connected after the test cable.

In the representative configuration, the error amplifier 212 receives sense voltage $V_{SENSE}$ at its negative input through a feedback circuit, including resistor $R_1$, for sensing the output voltage of the transient response circuit 230 at the negative input. The error amplifier 212 compares the sense voltage $V_{SENSE}$ with the adjustable reference voltage $V_{REF}$ 221 received at its positive input. The error amplifier 212 outputs an error signal (e.g., the PWM control signal) indicating the difference between the sense voltage $V_{SENSE}$ and the reference voltage $V_{REF}$ 221. The PCM control signal is provided to the PWM 214, which adjusts its duty cycle in response to compensate for changes in the output voltage of the transient response circuit 230 and/or the reference voltage $V_{REF}$ 221. For example, when the sense voltage $V_{SENSE}$ indicates a drop in the output voltage, the error amplifier 212 outputs a positive error signal, which controls the PCM 214 to increase the voltage level. Thus, the power supply 210 functions similarly to when there is no transient response circuit 230, except that the feedback signal (sense voltage $V_{SENSE}$) is received from the output of the transient response circuit 230, as opposed to the output of the power supply 210.

The error signal output by the error amplifier 212 is also output to the transient response circuit 230. More particularly, the error signal is AC coupled by AC coupling capacitor 231 to a gain stage of the transient response circuit 230, which includes non-inverting gain stage amplifier 232. The gain stage amplifier 232 has a positive input connected to the coupling capacitor 231 and to the common voltage $V_{COMMON}$ through resistor $R_3$, a negative input connected to the common voltage through resistor $R_5$, and an output connected to differential amplifier/driver 240 through resistor $R_C$. The output of the gain stage amplifier 232 is also connected to its negative input through resistor $R_4$, which is connected to the common voltage $V_{COMMON}$ through the resistor $R_5$. The output of the gain stage amplifier 232 is indicated as $V_C$ (with respect to $V_{COMMON}$).

The dual input differential amplifier/driver 240 sums the $V_C$ signal with respect to $V_{COMMON}$ (through the two $R_C$ resistors) and the $V_Q$ signal with respect to $V_{ANODE}$ (through the two $R_Q$ resistors), and provides a $V_{DRIVE}$ output with respect to $V_{ANODE}$ (by means of the $R_D$ resistors). The $V_Q$ signal is the output of a slow quiescent current loop, which includes quiescent current differential amplifier 250, discussed below. The output of the differential amplifier/driver 240 is connected to the gate of a source follower FET 270. In an embodiment, the differential amplifier/driver 240 may be connected to the gate of the source following FET 270 through a non-linear network, which includes forward biased diode 261 connected in parallel with diode 263 and resistor $R_6$, for example, where diodes 261 and 263 have opposite polarities. The non-linear network improves stability of the drive signal $V_{DRIVE}$ output from the differential amplifier/driver 240 to control a gate of source following FET 270, discussed below. Also, the non-linear network is configured to cause a turn-on time constant of the FET 270 to be shorter than a turn-off time constant of the FET 270. The output of the differential amplifier/driver 240 ($V_{DRIVE}$) is referenced to $V_{ANODE}$ through the two $R_D$ resistors.

The quiescent current differential amplifier 250 has a positive input connected to reference voltage $V_{REFQ}$ 255 and a negative input connected to shunt resistor $R_S$ and resistor $R_7$. The output $V_Q$ of the quiescent current differential amplifier 250 is connected to the input of the differential amplifier/driver 240 through the pair of resistors $R_Q$. Compensation capacitor 251 is connected between the output and the negative input of the quiescent current differential amplifier 250. The output signal of the compensation capacitor 251 is indicated as quiescent voltage $V_Q$. The quiescent current differential amplifier 250 compares the voltage across the shunt resistor $R_S$ and the reference voltage $V_{REF}$ 255. This regulates current $I_Q$ to a level equal to $V_{REFQ}$ divided by $R_S$. The current $I_Q$ is provided to the FET 270, keeping the FET 270 in a slightly on state, even when the control voltage $V_C$ is zero.

Referring now to the FET 270, the gate of the FET 270 is connected to the output of the differential amplifier/driver 240 through the non-linear network (via diode 261) and gate resistor $R_G$. The gate can also be negatively biased by a bias voltage through resistor $R_G$. The gate of FET 270 is modulated by the drive signal $V_{DRIVE}$ from the amplifier/driver 240, which is responsive to the gain stage amplifier output $V_C$. The FET 270 also has a drain connected to the output of the power supply 210 via shunt resistor $R_S$, and a source connected to the output (e.g., positive output terminal) of the transient response circuit 230. As stated above, the FET 270 may be implemented using various types of FETs and/or other types of transistors, without departing from the scope of the present teachings, including for example, a BJT. Also, the FET 270 is configured as a source follower transistor, in that the source voltage follows the gate voltage.

The FET 270 is connected in parallel with diode 290, which is connected between the output of the power supply 210 and a positive output terminal of the transient response circuit 230. The diode 290 may be a single or multiple p-n junction silicon diode, for example, although various types and numbers of diodes may be incorporated, without departing from the scope of the present teachings. The diode 290 includes an anode connected to the output of the power supply 210 and a cathode connected to the positive output terminal of the transient response circuit 230. The voltage at the anode of the diode 290 is indicated as $V_{ANODE}$. In this configuration, the diode 290 conducts current $I_D$ when the FET 270 is conducting the smaller quiescent current $I_Q$, causing a forward voltage drop, e.g., of about 0.7V, in the voltage output by the power supply 210 (i.e., the output of the power supply 210 without the transient response circuit 230). In various embodiments, one or more additional diodes may be included in series with the diode 290, which would provide an additional forward voltage drop, to provide unique benefits for any particular situation or to meet application specific design requirements of various implementations, as would be apparent to one skilled in the art.

In the depicted representative embodiment, the relationship among the amplifiers of the transient response circuit 230 (i.e., gain stage amplifier 232, differential amplifier/driver 240 and quiescent current differential amplifier 250) is represented by the following equation:

$$(V_{DRIVE}-V_{ANODE})=(V_C-V_{COMMON})R_D/R_C-(V_Q-V_{ANODE})R_D/R_Q$$

Also, in the depicted embodiment, the transistor 270 is only slightly on conducting quiescent current $I_Q$ when the output voltage of the power supply 210 is unchanged or decreasing. In this state, the diode 190 conducts current $I_D$ and inserts the forward voltage drop in the output voltage of the power supply 210, such that the output voltage of the transient response circuit 230 is less than the output voltage of the power supply 210 by about the amount of the forward voltage drop of the diode 190.

The transistor 270 is turned on during an increase in output load current, in response to a detected drop in the output voltage of the transient response circuit 230 and/or a detected increase in the reference voltage $V_{REF}$ 221. During a large load transient, the transistor 270 may be turned on completely, so that the diode 290 is substantially bypassed, and thus effectively shorted out. In this state, the diode 290 does not conduct current $I_D$ or subtract any portion of the forward voltage drop. Accordingly, the output voltage of the transient response circuit 230 can quickly increase by the full amount of the forward voltage drop, thereby negating any voltage drop on the PWM output capacitor 216, and improving the transient response of the power supply 210. When the output current increases gradually or by a small amount, the transistor 270 is only partially turned on, so that a portion of the forward voltage drop of the diode 290 is removed from the output voltage of the power supply 210. The improvement in the transient response therefore varies to fit the particular circumstances.

The FET 270 is also connected in parallel with a snubber network, including resistor $R_9$ and snubber capacitor 283, which are connected between the output of the power supply 210 and the positive output terminal of the transient response circuit 230. The snubber network is configured to provide for local stability of the source follower stage.

In the depicted embodiment, the transient response circuit 230 also includes a bleed circuit, including transistor 237, connected between the positive and the negative output terminals of the transient response circuit 230. In the depicted embodiment, the transistor 237 is a BJT, having a base connected to the common voltage $V_{COMMON}$ through reference voltage $V_{REF}$ 238, a collector connected to the positive output terminal of the transient response circuit 230, and an emitter connected to the negative output terminal of the transient response circuit 230 (e.g., common voltage $V_{COMMON}$) through resistor $R_{10}$.

As discussed above, the bleed circuit 237 provides a small bleed current $I_{BLEED}$ (e.g., which is proportional to $V_{REF}$ 238). When there is no load across the output of the transient response circuit 230, the bleed current $I_{BLEED}$ is equal to the sum of the diode current $I_D$ through the diode 290 and the quiescent current $I_Q$ through the shunt resistor $R_S$ and FET 270. For example, for DC (static conditions), $I_D=I_{BLEED}+I_{LOAD}-I_Q$. Since $I_Q$ is less than $I_{BLEED}$, $I_D$ is always greater than zero, even with $I_{LOAD}$ equal to zero. In various embodiments, the bleed circuit 237 may be included within the power supply 210.

An example is described below for purposes of explanation, in which it may be assumed that a DUT (not shown) is connected to the transient response circuit 230 by a cable having a resistance of ¼ ohm, and requiring application of 10V at zero to 1 Amp for testing purposes. The adjustable reference voltage $V_{REF}$ 221 may therefore be set to 10V, so that the output of the combined power supply 210 and transient response circuit 230 is 10V. It may be further assumed that the diode 290 has a forward voltage drop of about 0.7V. Therefore, when the output voltage of the transient response circuit 230 is 10V, the output voltage of the power supply 210 (across the PWM output capacitor 216) is 10.7V.

When the DUT draws additional current, for example from zero to 1 Amp, the output voltage of the transient response circuit 230 begins to drop. The drop in the output voltage is communicated as $V_{SENSE}$ to the error amplifier 212 via the feedback circuit, which detects the increasing difference between the sense voltage $V_{SENSE}$ and the reference voltage $V_{REF}$ 121, and adjusts the output error signal (PWM control signal) to increase the voltage output by the PWM 214.

However, as discussed above, the PWM output capacitor 216 in the output stage of the power supply 210 is not capable of increasing quickly. Therefore, according to various embodiments, the error signal output by the error amplifier 212 is provided to the gain stage amplifier 232 through the AC coupling capacitor 231). The amplified error signal is output by the gain stage amplifier 232 as $V_C$, added to the $V_Q$ input, and provided to the differential amplifier/driver 240. In response, the differential amplifier/driver 240 increases the signal $V_{DRIVE}$ with respect to $V_{ANODE}$. In this example, the voltage at the output would drop by (1 Amp)(¼ ohm), which is 0.25V, due to the cable resistance, if the transient response circuit 230 were not present. With the addition of the transient response circuit 230, the FET 270 can be turned on enough to bypass the voltage drop of the diode 290 from about 0.7V to about 0.45V, thereby compensating for the 0.25V drop in the ¼ ohm cable. During this time, the voltage on the PWM output capacitor 216 may be nearly constant due to its large size.

The representative resistors and capacitors depicted in FIG. 2 may vary in size and value to provide unique benefits for any particular situation or application specific design requirements of various implementations, as would be apparent to one skilled in the art.

According to the various embodiments, a transient response circuit connected to a relatively slow switching power supply is able to provide a fast transient response, similar to that which can be achieved with a linear power supply. The transient response circuit includes a source follower stage configured to selectively bypass a diode connected in series with the output stage of the power supply when the output current load of the power supply is increasing. As stated above, the output response to current transients that are above a certain minimal level by momentarily increasing the effective bandwidth of the power supply. For DC operation and for current transients below the minimal level, the operation and/or output impedance of the power supply are basically unaffected.

Accordingly, the transient response circuit provides a cost effective way to convert existing switching regulator power supply designs to improve transient response to a level usually achievable only with linear power supplies. The linear power supplies have poor efficiency and generate a lot of heat, whereas the representative embodiments of the coupled transient response circuit coupled and switching power supply has high efficiency and generates negligible heat, thus differing from the efficiency of a conventional switching power supply only by the addition of a diode drop in series with the output.

In view of this disclosure it is noted that variant amplifier circuits can be implemented in keeping with the present teachings. Further, the various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A device for improving transient response of a power supply, the device comprising:
   a diode connected in series with an output of the power supply and configured to provide a predetermined voltage drop to an output voltage of the power supply;
   a source follower transistor connected in parallel with the diode and configured to be selectively activated, partially or entirely bypassing the diode, to remove at least a portion of the predetermined voltage drop of the diode from the output voltage of the power supply for quickly increasing the output voltage during a transient period, in which an output current of the device is increasing;
   a differential amplifier driver configured to output a drive voltage by summing a quiescent current signal and a gain stage voltage, an output of the differential amplifier driver being connected to a gate of the transistor for selectively activating the transistor based on the drive voltage; and
   a gain stage amplifier configured to output the gain stage voltage by comparing an error voltage from an error amplifier in the power supply and a common voltage.

2. The device of claim 1, wherein the transistor comprises a field effect transistor (FET).

3. The device of claim 2, wherein the transistor is selectively activated by completely turning on the transistor, which effectively shorts the diode and removes the predetermined voltage drop from the output voltage of the power supply.

4. The device of claim 2, wherein the transistor is selectively activated by partially turning on the transistor, which removes a portion of the predetermined voltage drop from the output voltage of the power supply.

5. The device of claim 1, further comprising:
   an AC coupling configured to selectively connect the error voltage from the error amplifier to the gain stage amplifier during the transient period.

6. The device of claim 1, further comprising:
   a non-linear circuit connected between the output of the differential amplifier driver and the gate of the transistor, the non-linear circuit being configured to cause a turn-on time constant of the transistor to be shorter than a turn-off time constant of the transistor.

7. The device of claim 6, further comprising:
a quiescent current loop configured to bias the transistor to an activated state at times other than the transient period.

8. The device of claim 7, wherein the quiescent current loop comprises a quiescent current differential amplifier connected between the anode voltage of the diode and an input of the differential amplifier driver, the quiescent current differential amplifier outputting a quiescent voltage to an input of the differential amplifier driver by comparing a reference voltage and a shunt voltage from a shunt resistance connected between the anode voltage and a drain of the transistor.

9. The device of claim 1, wherein the power supply comprises a switching power supply.

10. A transient response device for improving transient response of a power supply, the device comprising:
a diode comprising an anode connected in series with a power supply output and a cathode connected to an output of the transient response device, and configured to provide a predetermined voltage drop to an output voltage of the power supply;
a gain stage amplifier configured to output a gain stage voltage based on an error voltage of an error amplifier in the power supply;
a differential amplifier/driver configured to output a drive voltage based on the gain stage voltage of the gain stage amplifier and an anode voltage at the anode of the diode; and
a transistor comprising a gate connected to an output of the differential amplifier/driver to receive the drive voltage, a drain connected to the anode of the diode, and a source connected to the cathode of the diode, the transistor being selectively activated in response to the drive voltage to remove at least a portion of the predetermined forward voltage drop of the diode from the power supply voltage during a transient period, in which an output current of the device is increasing.

11. The device of claim 10, wherein the transistor comprises a field effect transistor (FET).

12. The device of claim 10, wherein, an extent to which the transistor is turned on corresponds to an amount and speed with which the output current is increases.

13. The device of claim 12, wherein, when the transistor is completely turned on, the diode is effectively shorted and the predetermined voltage drop is entirely removed from the output voltage of the power supply.

14. The device of claim 12, wherein, when the transistor is partially turned on, a portion of the predetermined voltage drop is removed from the output voltage of the power supply.

15. The device of claim 10, further comprising:
an AC coupling configured to selectively connect the error voltage from the error amplifier to the gain stage amplifier during the transient period.

16. The device of claim 10, wherein the power supply comprises a switching power supply.

17. The device of claim 10, wherein the transistor is biased slightly on when the output voltage of the power supply is unchanged or decreasing.

18. The device of claim 17, further comprising:
a snubber network connected in parallel with the diode and configured to provide for local stability of the transistor.

19. A regulated power supply device comprising:
a switching power supply circuit having a first output to output a power supply voltage; and
a transient response circuit connected to the switching power supply and having a second output to output an adjusted power supply voltage,
wherein the switching power supply comprises:
an error amplifier configured to output an error voltage based on a reference voltage and a sense voltage fed back from the second output; and
a pulse width modulator (PWM) configured to generate the power supply voltage in response to the error voltage of the error amplifier; and
wherein the transient response circuit comprises:
a gain stage amplifier configured to output a gain stage voltage based on a common voltage and the error voltage of the error amplifier selectively received trough an AC coupler;
a diode comprising an anode connected in series with the first output and a cathode connected to the second output, the diode being configured to cause a predetermined forward voltage drop in the power supply voltage output from the first output of the power supply device;
a differential amplifier/driver configured to output a drive voltage based on the gain stage voltage of the gain stage amplifier and an anode voltage at the anode of the diode; and
a transistor comprising a gate connected to an output of the differential amplifier/driver to receive the drive voltage, a drain connected to the anode of the diode, and a source connected to the cathode of the diode, the transistor being selectively activated in response to the drive voltage to remove at least a portion of the predetermined forward voltage drop of the diode from the power supply voltage to increase the adjusted power supply voltage when the sense voltage begins decreasing.

\* \* \* \* \*